United States Patent [19]

Roff

[11] Patent Number: 4,520,839

[45] Date of Patent: * Jun. 4, 1985

[54] VALVE

[76] Inventor: Robert W. Roff, 15B Jetty Rd., Toora, Victoria, Australia

[*] Notice: The portion of the term of this patent subsequent to Aug. 3, 1999 has been disclaimed.

[21] Appl. No.: 481,413

[22] Filed: Apr. 1, 1983

[30] Foreign Application Priority Data

Apr. 5, 1982 [AU] Australia ............................ PF3468

[51] Int. Cl.³ ............................................ F16K 17/40
[52] U.S. Cl. ................................................ 137/202
[58] Field of Search ......................................... 137/202

[56] References Cited

U.S. PATENT DOCUMENTS

| 2,627,868 | 2/1953 | Runnels | 137/202 |
| 3,196,898 | 7/1965 | Semonsen | 137/202 |
| 3,665,156 | 5/1972 | Lee | 137/202 |
| 4,016,904 | 4/1977 | Gordon | 137/493.9 |
| 4,125,126 | 11/1978 | Davis, Jr. | 137/202 |
| 4,241,747 | 12/1980 | King, Sr. | 137/202 |
| 4,342,329 | 8/1982 | Roff | 137/202 |

Primary Examiner—Henry C. Yuen
Assistant Examiner—John Kwon
Attorney, Agent, or Firm—Griffin, Branigan, & Butler

[57] ABSTRACT

A valve for removing trapped air from a pump line, said valve having a resiliently biased valve member and a float.

9 Claims, 5 Drawing Figures

VALVE

BACKGROUND OF THE INVENTION

The present invention relates to a valve for removing trapped air from a pump line and relates particularly, although not exclusively, to a valve for removing trapped air from pump lines of tankers.

When unloading tankers, especially milk tankers, a lot of milk is lost whenever the line from the tanker is coupled to a pump. The loss results from the priming of the pump and may be in the order of 6 to 8 pints. The air must be removed from the line and usually the milk is allowed to escape until the pump is primed. With the tightening of pollution controls, means are now required to eliminate such waste and prevent the fatty substances contained in the milk from entering drains which may discharge into rivers, etc.

In one solution to this problem a valve device is coupled to a T-piece connection in the pump line. The valve consists of a tube with a spherical portion intermediate thereof. A ball valve is contained within the spherical portion and in the closed position covers the lower-most valve seat formed by the interface between the tube and the spherical portion. Air may escape by displacing the ball valve and allowing air to pass through the spherical portion and to exit through the opposing open end of the tube. When the air has escaped the ball valve will be forced up into the upper-most position to prevent air entering the pump line. The problem with this type of valve is that it is extremely difficult to clean and air may enter the valve under fattening pressure.

SUMMARY OF THE INVENTION

It is an object of the present invention to provide a valve which is easy to clean and readily removes trapped air from pump lines.

A further object is to provide a valve which alleviates the presence of air under fattening pressure in the pump lines.

With these objects in view the present invention provides a valve for removing trapped air from a pump line, said valve including an apertured member, a valve member on one side of said apertured member which covers said aperture(s) for allowing escape of trapped air, biasing means for resiliently biasing said valve member toward its closed position and a float member on the other side of said apertured member adapted to cover said aperture(s) when said trapped air has been removed or substantially removed.

Preferably said valve member is a disc and includes a depending stem which passes through said apertured member, said stem including a spring held captive between the free end of said stem and the other side of said apertured member to provide said resilient bias.

BRIEF DESCRIPTION OF THE DRAWINGS

In order that the invention may be better understood and put into practical effect there will now be described preferred practical embodiment of a valve according to the present invention with reference to the accompanying drawings. In the drawings.

DETAILED DESCRIPTION OF THE INVENTION

Figure 1:
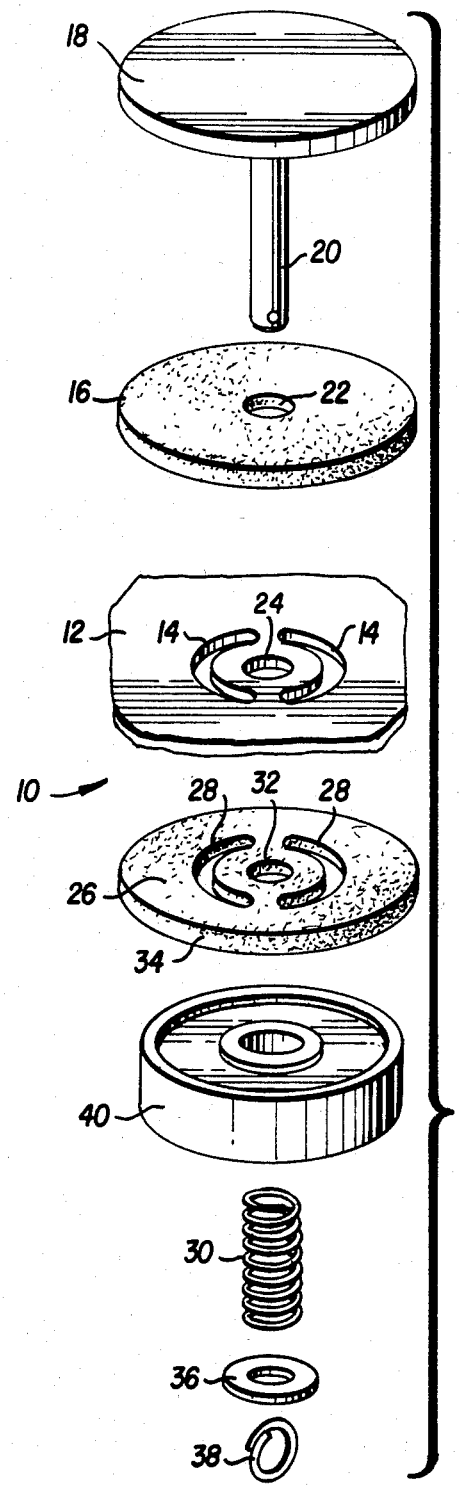
FIG. 1 is an exploded perspective view of the valve made in accordance with the invention.
Figure 2:
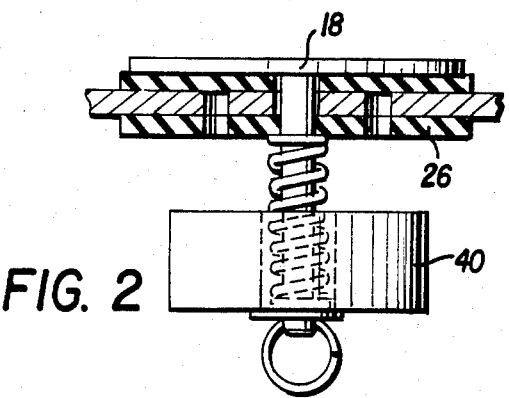
FIG. 2 is a cross-sectional view of the valve shown in FIG. 1 shown in its closed position.

In the drawings there is shown a valve 10 with main member 12 having ports 14. The number of ports is not important, providing at least one is available for escape of trapped air. Overlying the ports 14 is a resilient washer 16 and a valve member 18. The valve member 18 has a centrally depending stem 20 which projects through the valve member 18 and washer 16, via central apertures 22 and 24.

On the other side of main member 12 is a further resilient washer 26 which has ports 28 matching those of ports 14. Stem 20 projects through a central aperture 32 of washer 26. A spring 30 is coaxially located over stem 20 between the innermost surface 34 of washer 26 and a washer 36 retained on stem 20 by a spring clip 38. A hollow float 40 of diameter sufficient to cover ports 14 and 28 is located over spring 30 between surface 34 and washer 36.

Figure 3:
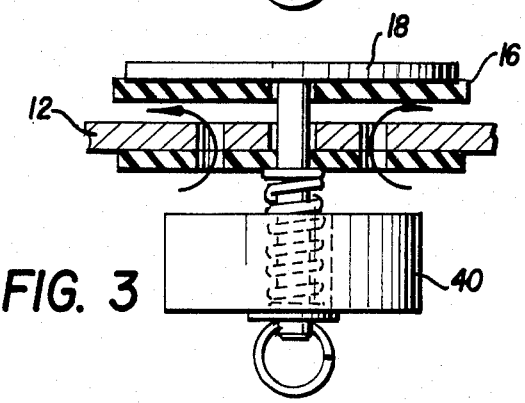
FIG. 3 is a similar view to that of FIG. 2 showing the valve in its open position.
Figure 4:
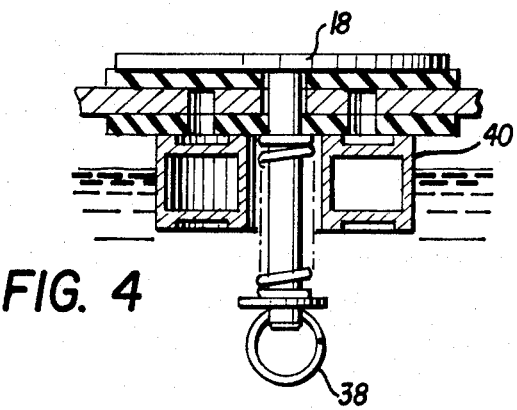
FIG. 4 is a similar view to that of FIG. 2 showing the valve in its completely closed position.

The operation of the valve will now be described. The valve is normally coupled to a T-piece connection in the pipe line on either the inlet or the exit side of a pump (not shown) with the valve fitted, e.g. to the pump inlet side, air which is trapped in the pump line ahead of any liquid from a tanker can be expelled through the valve. During priming of the pump the trapped air will act on washer 16 and valve member 18 to overcome the spring bias and allow air to escape through ports 28 and 14 as shown by the arrows in FIG. 3. As the air is removed washer 16 will sealingly engage over ports 14 to close off the valve. The rising of the liquid will also cause float 40 to abut washer 26 and seal off ports 28, as shown in FIG. 4. In this position the pump will have been primed and the pump will commence its normal pumping operation. The pressure drop from pumping may allow float 40 to fall back onto washer 36. As the atmospheric pressure acting on valve member 18 is greater than the pressure inside the pipe line, valve member 18 and washer 16 will prevent entry of air into the valve during pumping.

Figure 5:
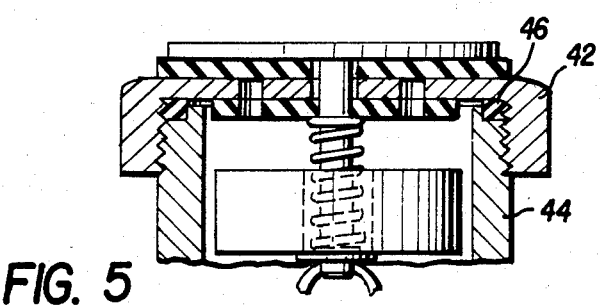
FIG. 5 is a similar view to that of FIG. 2 showing the valve incorporated into a threaded fitting.

FIG. 5 shows the main member 12 incorporated into a screw-threaded member 42 which may be screwed onto a threaded T-piece member 44. The member 44 joins the pump line (not shown) at right angles thereto. A suitable seal 46 ensures a leakproof fitting. If desired the threads could be replaced by flanges which are clamped together.

It will be appreciated that washer 16 could be omitted if valve member 18 were made from a plastics material as a plastics material would have a self-sealing effect. Washer 26 could also be omitted if float 40 included a seal on the top thereof.

It is to be understood that many modifications may be made in details of design or construction without departing from the ambit of the invention, the nature of which is to be ascertained from the appended claims.

I claim:

1. A valve for removing trapped air from a pump line, said valve including an apertured member, a valve member on one side of said apertured member which covers said aperture(s) for allowing escape of trapped air, biasing means for resiliently biasing said valve member toward its closed position and a float member on the other side of said apertured member adapted to cover said aperture(s) when said trapped air has been removed or substantially removed.

2. The valve as claimed in claim 1, wherein said valve member is a disc.

3. The valve as claimed in claim 2, wherein said valve member has a depending stem which passes through said apertured member, said stem including a spring held captive between the free end of said stem and the other side of said apertured member to provide said resilient bias.

4. The valve as claimed in claim 3, wherein said float member is located on said stem.

5. The valve as claimed in any preceding claim, wherein said float includes a sealing member where it abuts said apertured member.

6. The valve as claimed in any preceding claim, wherein said apertured member is a nut member adapted to be screwed to a threaded connection in said pump line.

7. The valve as claimed in any preceding claim, wherein a first resilient sealing member is provided between said valve member and said one side of said apertured member.

8. The valve as claimed in any preceding claim, wherein a second resilient member is provided between said float member and said other side of said apertured member.

9. The valve as claimed in claim 8 when dependent on claim 3, wherein said spring abuts said second resilient member.

* * * * *